United States Patent
Church

(10) Patent No.: US 6,832,789 B2
(45) Date of Patent: Dec. 21, 2004

(54) THREADED PIPE CONNECTION WITH CYLINDRICAL METAL-TO-METAL, HIGH PRESSURE CONTAINMENT SEAL

(75) Inventor: Kris L. Church, Montgomery, TX (US)

(73) Assignee: Torquelock Corporation, Conroe, TX (US)

( * ) Notice: Subject to any disclaimer, the term of this patent is extended or adjusted under 35 U.S.C. 154(b) by 18 days.

(21) Appl. No.: 10/285,911

(22) Filed: Nov. 1, 2002

(65) Prior Publication Data

US 2004/0084901 A1 May 6, 2004

(51) Int. Cl.$^7$ ................................................ F16L 25/00
(52) U.S. Cl. ...................... 285/333; 285/334; 285/340
(58) Field of Search ............................... 285/333, 334, 285/390, 355

(56) References Cited

U.S. PATENT DOCUMENTS

| | | | |
|---|---|---|---|
| 4,384,737 A | | 5/1983 | Reusser ........................ 285/334 |
| 4,537,429 A | * | 8/1985 | Landriault ................... 285/334 |
| 4,662,659 A | * | 5/1987 | Blose et al. ................. 285/334 |
| 4,692,988 A | * | 9/1987 | Shulver et al. ............... 29/458 |
| 5,064,224 A | * | 11/1991 | Tai ............................... 285/94 |
| 5,066,052 A | * | 11/1991 | Read ........................... 285/334 |
| 5,154,452 A | * | 10/1992 | Johnson ...................... 285/333 |
| 5,338,074 A | | 8/1994 | Barringer et al. ............ 285/334 |
| 5,415,442 A | * | 5/1995 | Klementich ................. 285/331 |
| 5,649,725 A | * | 7/1997 | Nagasaku et al. .......... 285/334 |
| 6,045,165 A | * | 4/2000 | Sugino et al. ............... 285/333 |
| 6,158,785 A | | 12/2000 | Beaulier et al. ............. 285/334 |
| 6,254,146 B1 | | 7/2001 | Church ........................ 285/334 |
| 6,511,102 B2 | * | 1/2003 | Krug et al. .................. 285/334 |
| 6,530,607 B1 | * | 3/2003 | Mallis et al. ................ 285/333 |
| 6,581,980 B1 | * | 6/2003 | DeLange et al. ............ 285/334 |
| 2002/0033603 A1 | * | 3/2002 | Pallini et al. ................ 285/333 |

* cited by examiner

*Primary Examiner*—Erik K. Nicholson
(74) *Attorney, Agent, or Firm*—Charles D. Gunter, Jr.

(57) ABSTRACT

A threaded pipe connection is shown which features a cylindrical metal-to-metal containment seal. In addition to the cylindrical sealing surfaces, the connection utilizes a separate ramp or ramp regions that simulate a pin swaging or a box expansion which results in the ability of the cylindrical components of the seal to assemble without interference or with only slight interference.

26 Claims, 6 Drawing Sheets

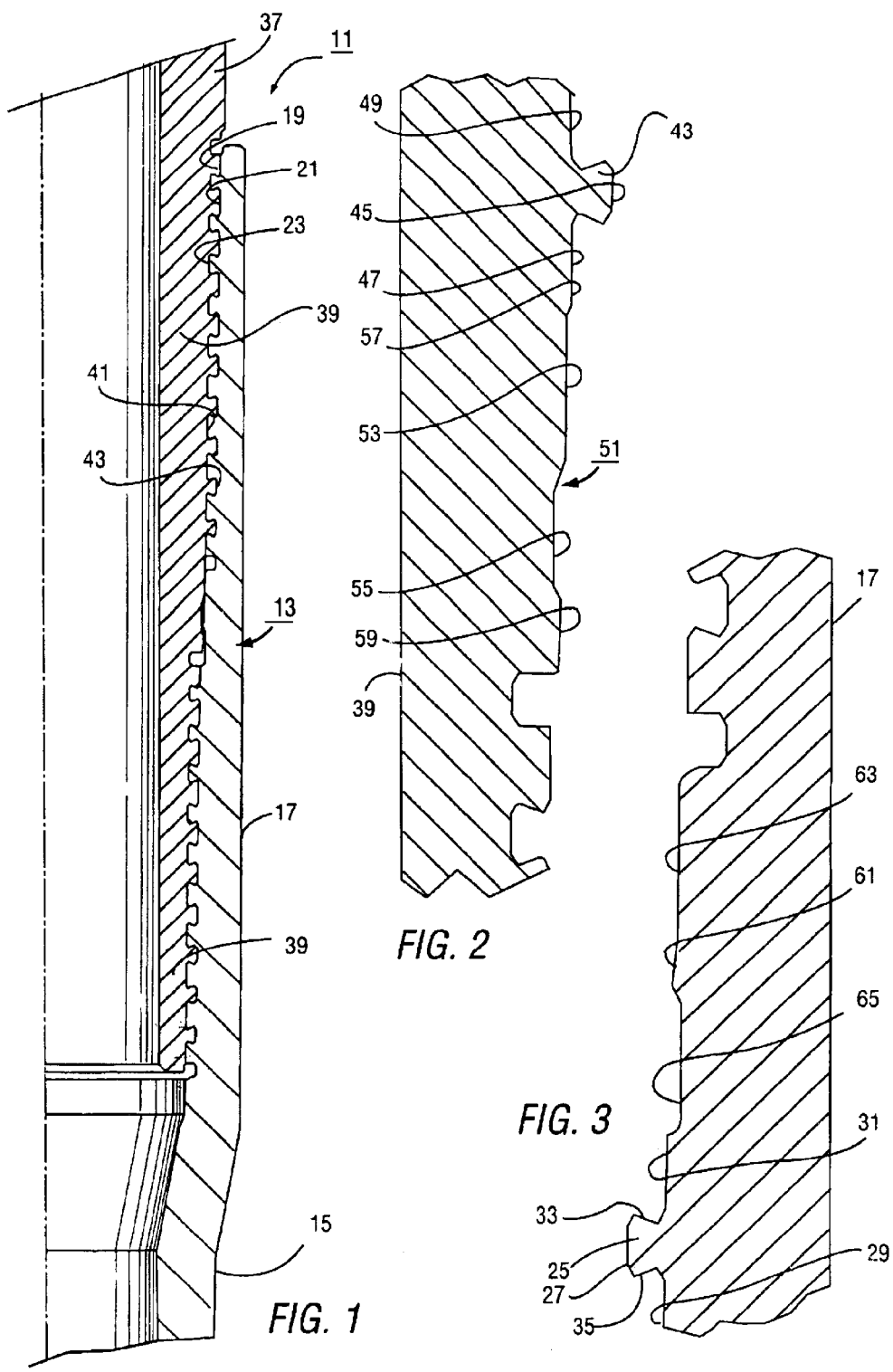

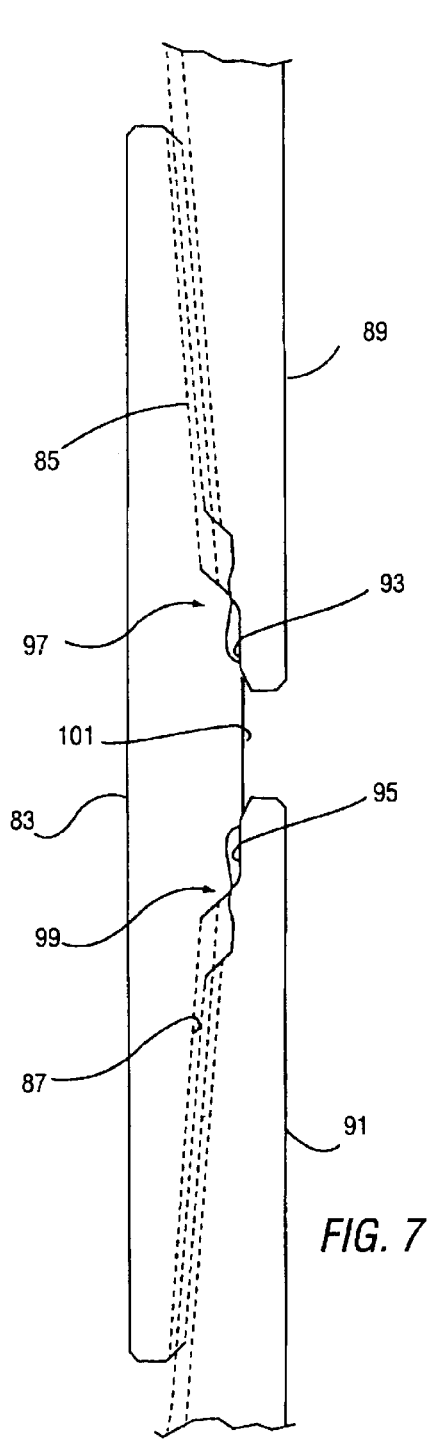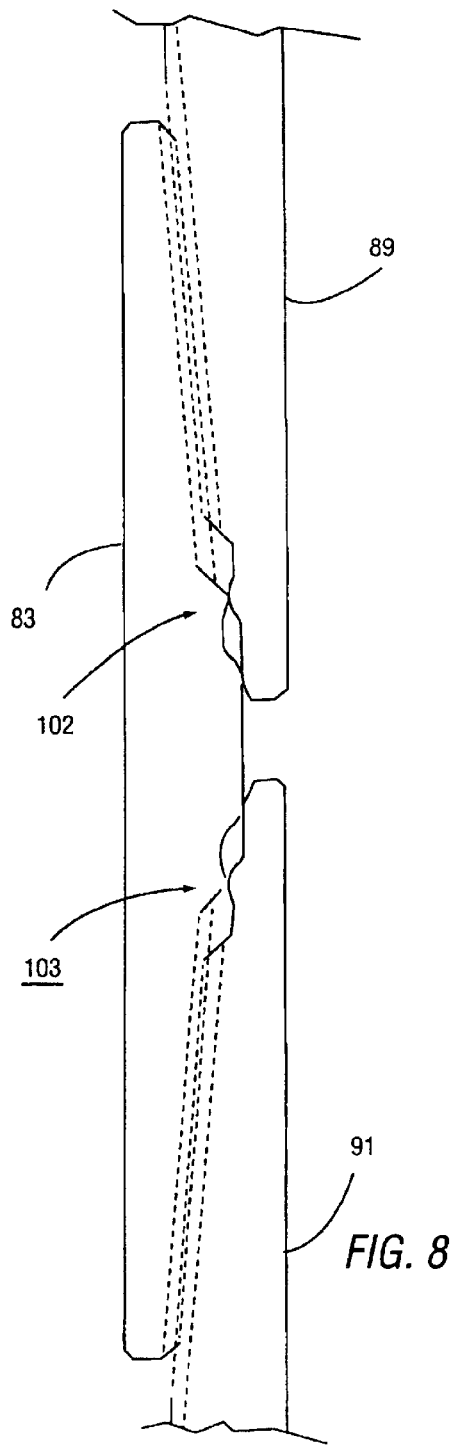

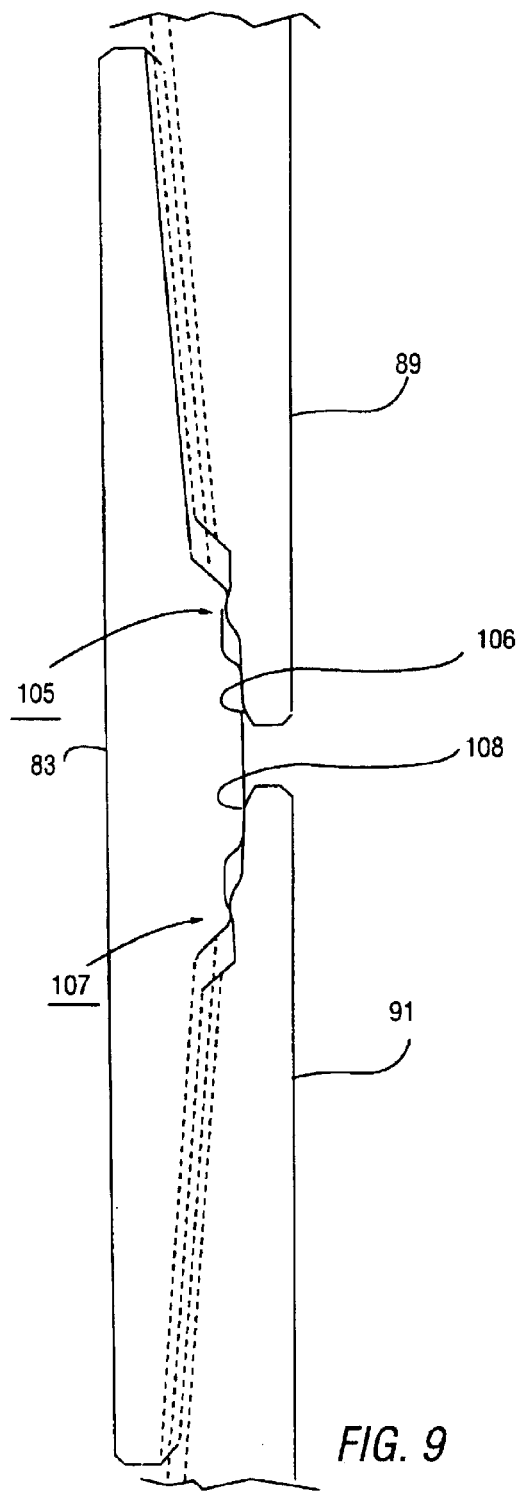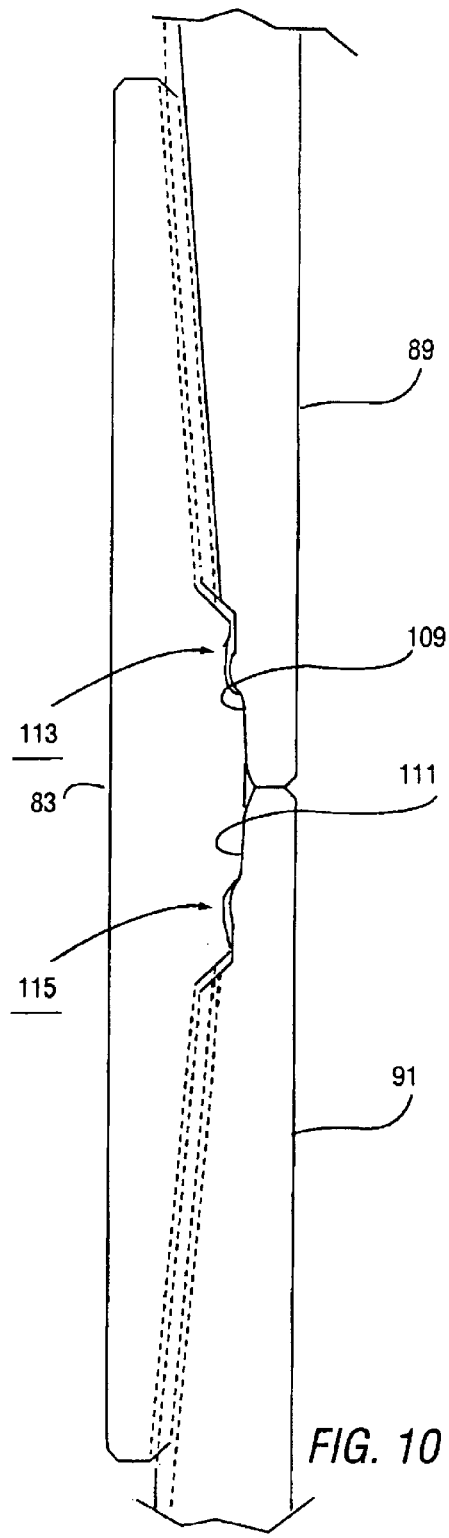

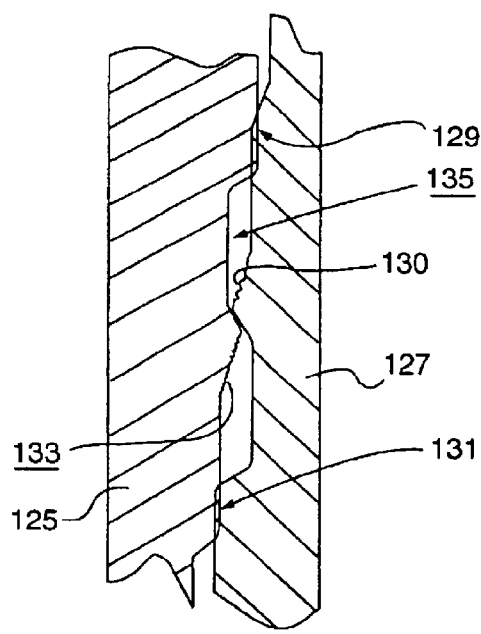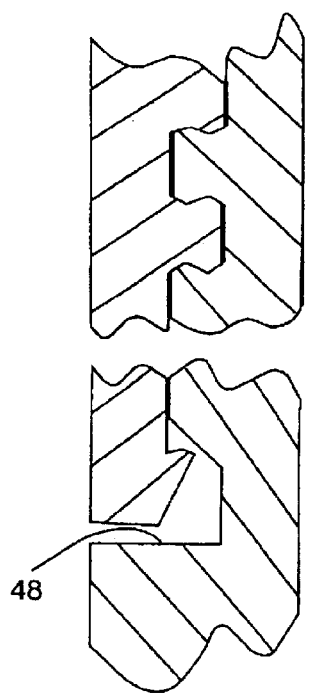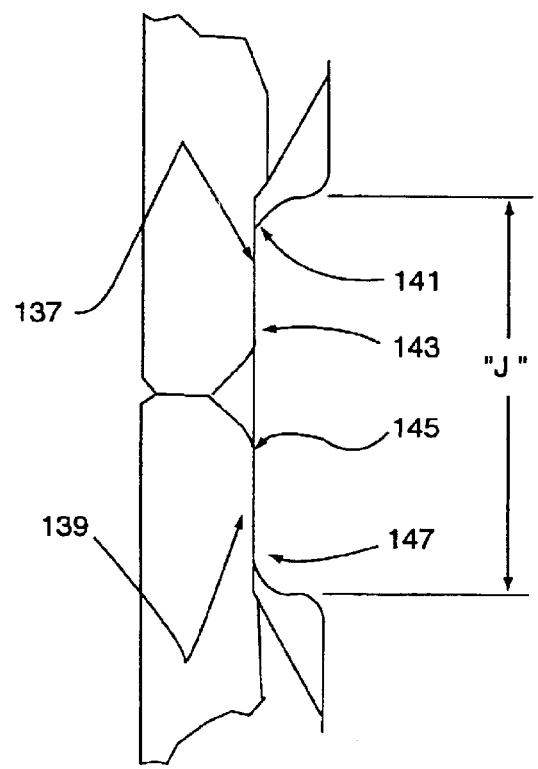
FIG. 13  FIG. 14

THREADED PIPE CONNECTION WITH CYLINDRICAL METAL-TO-METAL, HIGH PRESSURE CONTAINMENT SEAL

BACKGROUND OF THE INVENTION

1. Field of the Invention

This invention relates generally to threaded tubular joints or connections and to seals for such connections. More specifically, the invention relates to a tubular joint for connecting the male or pin end of a pipe member to the female or box end of a pipe member in which cylindrical surfaces on the box and pin engage to provide a metal-to-metal seal for the connection.

2. Description of the Prior Art

The use of tubular threaded connections for joining flow conduits in an end-to-end relationship to form a continuous flow path for transporting fluid under pressure is well known. Oil field tubular goods, for example, use such threaded connections for connecting the adjoining sections of conduit or pipe. Oil and gas wells currently are being drilled which extend for thousands of feet into the surrounding subterranean formations. In the drilling of such wells, tool joints having oppositely extending threaded couplings are used to form a drill string and support a drill bit at a lower end thereof. Once the well has been drilled to the final desired depth, a casing having a diameter greater than the diameter of the drill pipe is driven into the earth. The casing surrounds and supports tubing and prevents the sidewalls of the borehole from collapsing. In this discussion, the "pipe member" will be understood to refer to tubing, casing, production pipe, drill pipe, special offshore platform tubulars, construction industry horizontal directional drilling tubulars, etc.

The connections for strings of drill pipe, tubing or casing must be able to withstand the total weight of a string of pipe many thousands of feet long. Since the drill string must also be used for the purpose of drilling, the joints must be able to withstand high torque loads, as well. Additionally, wells may not be driven in exactly vertical fashion or even in straight line fashion. Horizontal drilling operations are common today. The tubing used to drill the well and/or convey fluid from the well must be able to follow the course of the well as greater depths are reached. This places bending loads on the drill, casing or tubing strings at various places along the length thereof. Sections of tubing or casing are sometimes driven into the well, resulting in compressive loads being exerted. Thus, in addition to withstanding tremendous tensile loads, the threaded connections in the pipe string must also be able to absorb considerable compression loads.

The pipe strings of the type under consideration must have joints that provide a seal against leakage between mating threaded members. This can be achieved by providing a metal-to-metal seal, upon make-up. It is important that the mating sealing sections be free of defects or damage because, unless substantial surface-to-surface contact is maintained, leakage will likely occur. This is particularly true in the case of very deep wells due to the extreme fluid pressures involved.

Damage also can occur during the assembling of the joints in that the components to be assembled are heavy and unwieldy. Thus, it is often too difficult to handle the pipe sections without damage, particularly as a new pipe section is being "stabbed" into a coupling. The result is that threads can be blemished and that sealing surfaces can be damaged.

It is typically desirable to have a positive stop for the connection so that when a pre-determined level of threaded engagement has been reached, rotation of the pipe section will be stopped abruptly. This is necessary to accurately control the torque applied to the pipe section so that portions of the joint are not over stressed. The necessity of a positive stop has, on occasion, limited the available designs which could be utilized for the threaded connections.

Known prior art threaded connections used on oil field tubular goods often utilized a combination of specially designed "premium" threads and tapered (conical) sealing surfaces that engage to form a metal-to-metal seal to contain high pressures. The premium threads often generate radial interference as a means for retaining the make-up torque of the connection and also to provide a resistant seal. In some designs, a resilient seal ring was also included.

In order to contain high pressures, the radial interference of the metal-to-metal conical sealing surfaces must be significantly greater than that of the threads to generate sufficient bearing stress to overcome the effect of machining tolerances and taper on the height of the threads most adjacent the seal and the effects of excessive pipe compound trapped in the threaded area. The presence of excessive metal-to-metal contact bearing stress at the conical sealing surfaces of the prior art containment seals often resulted in make-up damage, i.e., galling with the result that the sealing mechanism did not function reliably. More importantly, conical seals have a desirable nominal axial makeup position. Non-shouldered premium connections have critical diametrical tolerances and makeup torque restrictions to guarantee an axial makeup position so the conical seal does not accumulate excess or deficient diametrical interferences.

Known prior art designs also exist that combine a conical metal-to-metal seal with a wedge thread as a torque stop. These type designs typically required a shallower angle for the metal-to-metal seal because of lenient axial tolerances required to machine the threads. In order to generate enough radial interference in the metal-to-metal seal to effect an efficient sealing mechanism, a great deal of rotation was required between initial contact of the sealing regions to final make-up. The longer the metal-to-metal seals were in contact during such rotation, the greater the tendency for galling. On the other hand, if interference was decreased to lessen the amount of rotational contact, sufficient contact forces were not always present to effect a reliable seal at final make-up.

Certain of the prior art seals described above were adequate for applications where liquid was being passed through the conduit. However, in applications where a gas was passed through the conduit, additional metal-to-metal seal regions were required.

The present invention has as one object to provide a threaded pipe connection having a cylindrical metal-to-metal, high pressure containment seal, or multiple seals, which exceed the capabilities of presently available tapered or conical metal-to-metal containment seals.

Another object of the invention is to provide such a cylindrical seal in a threaded pipe connection in which the mechanics of the seal have separated components that function independently, thereby having a unique function and purpose for each of the separate components.

Another object of the invention is to provide a threaded pipe connection with cylindrical metal-to-metal sealing surfaces rather than conical or tapered seal surfaces and with separated, tapered ramp regions which simulate pin swaging and/or box expansion, resulting in the ability of the cylindrical components of the seal to assemble without interference or with only very slight interference.

Another object of the invention is to provide a reliable metal-to-metal seal for a non-lubricated capable connection of the type commonly referred to in the industry as a dope-less connection.

SUMMARY OF THE INVENTION

The threaded pipe connection of the invention is characterized as having a cylindrical metal-to-metal, high-pressure containment seal capable of sealing both liquids and gases. The connection includes a first pipe member having a box end, the box end having an end opening defining an interior surface with internal threads. The internal threads are defined by crests and roots and opposing flanks. A second, mating pipe member has a pin end. The pin end has an exterior surface with mating external threads. The external threads also have crests and roots and opposing flanks, at least selected ones of which move into engagement with the internal threads of the box when the connection is made up. A generally cylindrical sealing surface on the box interior surface and a mating generally cylindrical sealing surface on the pin exterior surface form a primary containment seal upon make-up of the connection. A primary ramp region is formed on the pin exterior surface and a mating primary ramp region is formed on the box interior surface. The primary ramp regions are spaced apart from the cylindrical sealing surfaces which form the primary containment seal. The primary ramp regions are positioned with respect to the cylindrical sealing surfaces to simulate pin swaging and/or box expansion prior to full engagement of the cylindrical sealing surfaces, whereby the cylindrical sealing surfaces assemble with little or no interference or clearance.

Preferably, the primary ramp regions are selectively positioned to contact and interfere prior to full engagement of the cylindrical sealing surfaces and to be in full or near clearance as the full engagement of the cylindrical sealing surfaces occurs during the make-up of the connection. The mating cylindrical surfaces can be positioned on the box interior surface and/or on the pin exterior surface, respectively, so as to provide a desired degree of overlap before receiving an amount of interference necessary to form the primary containment seal for sealing off high-pressure liquids and/or gases. The threaded connection can also be provided with mating multiple ramp regions to transfer a selected gradual degree or radical degree of diametrical interference to the cylindrical sealing surfaces.

In a preferred form of the invention, the primary ramp regions are positioned on the box interior surface and on the pin exterior surface in preselected locations, whereby the pin end ramp region first rides up and onto the box primary ramp region as the connection is made up, whereby engagement of the primary ramp regions exerts an inward radial force on the pin end of the second, mating pipe member. The pin end primary ramp region then rides down the box primary ramp region as the connection continues to be made up. The primary ramp regions then enter a clearance region as the cylindrical sealing surfaces make contact and move to a fully engaged position.

Additional objects, features and advantages will be apparent in the written description which follows.

BRIEF DESCRIPTION OF THE DRAWINGS

FIG. 1 is a partial, cross-sectional view of a threaded pipe connection of the invention showing the box end of the first pipe member and the pin end of the second, mating pipe member in engagement.

FIG. 2 is a partial, isolated cross-sectional view of a portion of the pin member of the connection of FIG. 1.

FIG. 3 is an isolated, cross-sectional view of a portion of the box of the threaded connection of FIG. 1.

FIGS. 7–10 are views similar to FIGS. 4–6 but showing the make-up of an API connection or non-shouldered connection.

FIG. 13 is a modified cylindrical seal with metal-to-metal cylindrical sealing surfaces spaced on either side of the pin and box ramp regions.

FIG. 14 is a modified connection of the invention illustrating the cylindrical sealing surfaces used with API 8 Round type stock.

DETAILED DESCRIPTION OF THE INVENTION

Figure 4:
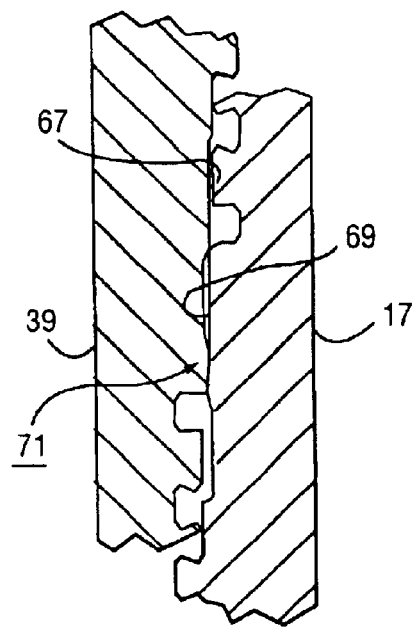
FIGS. 4–6 are isolated, cross-sectional views of the box and pin members of the connection of FIG. 1 showing the steps in making up the connection.

Turning to FIG. 1 there is shown a threaded pipe connection of the invention, designated generally as 11. The threaded pipe connection 11 is characterized has having a "cylindrical" metal-to-metal, high-pressure containment seal capable of sealing both liquids and gases. The cylindrical seal, located generally in the region designated as 13 in FIG. 1, is unique as compared to a conventional tapered seal. As will be explained more fully in the following description, the mechanics of the seal have separated components that function independently, thereby providing unique function and purpose to the design. Traditional tapered seals have components, each of which must perform two or more critical functions. For example, a conical (tapered) seal swages and/or expands as the connection is assembled. Additionally, the same surfaces or components function to seal off and contain high gas and/or liquid (fluid) pressure. The same components, for the most part, are textured in a fashion to reduce the potential for galling. In other known prior art designs, the conical, tapered seal region is relieved front and back to provide a burnishing effect to create an effective seal. These surfaces all serve a combined function instead of an individualized or separated function. As will be apparent in the following description, the individualization of the above described functions as well as optimization of the geometries and fits, provides a connection which is more reliable and fail safe in operation even in the presence of operator abuse.

Returning to FIG. 1, the connection includes a first pipe member 15 having a box end 17. The box end 17 has an end opening 19 defining an interior surface 21 within internal threads 23. As best seen in the isolated view of FIG. 3, each thread 25 is defined by crests 27 and roots 29, 31. Each thread also has opposing flanks 33, 35.

A second, mating pipe member 37 is provided having a pin end 39. The pin end 39 has an exterior surface 41 with mating external threads 43. The external threads 43, as shown in FIG. 2, also have crests 45 and roots 47, 49, at least selected ones of which move into engagement with the internal threads 23 of the box end 17 when the connection is made up.

The cylindrical metal-to-metal containment seal structure of the invention can be utilized with a variety of threaded connections known in the prior art. For example, such threaded connections are known for joining flow conduits in an end-to-end relationship to form a continuous flow path for transporting fluid. As discussed above, such threaded connections are used in pipe strings employed for the production of hydrocarbons and other forms of energy from subsurface earth formations. The previously described examples of such pipe strings include drill pipe, well casing and production tubing, referred to herein as "oil field tubular goods." Other threaded connections which can utilize the seal structure of the invention are used in the horizontal/trenchless drilling fields. There are also other non-oil field applications associated with the construction industry which could utilize the containment seal of the invention, as well. All of these type goods employ threaded connections of the type under consideration for connecting adjacent conduit sections or pipe joints.

There have been numerous advances in thread technology used in oil field applications in recent years. For example, the previously mentioned "wedge" threads are known having a thread form which provides an unusually strong connection while controlling the stress and strain in the connected pin and box members of the connection. Such thread forms typically feature mating helical threads which are tapered in thread width in opposite directions to provide wedge-like engagement of the opposing thread flanks to limit rotational make-up of the connection. While the containment seal structure of the invention can certainly be utilized with "wedge" and other premium connections, it is not limited to these more exotic forms. One important aspect of the seal is that the interference which occurs does not gain nor lose diametrical interference within a very generous stroke of assembly. This aspect of the invention provides a distinct advantage on connections that do not have shoulders acting as torque stops, such as API 8 Round, API 10 Round, API buttress, as well as the premium connections such as the wedge thread connections. It should be noted, however, that other types of connections, such as US Steel improved and also shouldered connections could use this advantage. The lower portion of FIG. 13 of the drawings has been extended to show a typical "shoulder" 48 utilized with the connection of the invention. There are other connections, as well, that do not employ shoulder torque stops which can be improved by incorporating these features.

To describe the cylindrical containment seal in greater detail, reference is best made to FIGS. 2 and 3 of the drawings. As shown in FIG. 2, the pin end 39 has formed on the exterior surface 51 thereof a primary ramp region 59 which is separated from the cylindrical pin sealing surface 53 via the clearance region 55 of lesser relative cross-sectional diameter. Plateau 57 and ramp 59 are located on opposite sides of the cylindrical sealing surface 53 and clearance region 55.

As shown in FIG. 3, the box end 17 also has a primary ramp region 61 which forms a transition between a cylindrical sealing surface 63 and a clearance region 65. In each case, the primary ramp regions are separate from the cylindrical sealing surfaces which form the primary containment seal. As will be apparent in the operational description which follows, the primary ramp regions, 59, 61 are positioned with respect to the cylindrical sealing surfaces 53, 63 to simulate pin swaging and box expansion prior to full engagement of the cylindrical surfaces 53, 63, whereby the cylindrical sealing surfaces 53, 63 assemble with or without overlap with little interference, no interference, or clearance. It will also be apparent from FIGS. 2 and 3 that the sealing surfaces 53, 63 are essentially "cylindrical." In other words, they are not tapered or conical surfaces as would be present in the traditional tapered seal. It will be understood, however, that the cylindrical surfaces 53, 63 could be provided with a slight taper as long as the interferences within the axial stroke of the device remain within the limits of full sealing integrity. In the most preferred form of the invention, the surfaces 53, 63 are cylindrical.

FIGS. 2–6 illustrate the functioning of the containment seal during make-up of the threaded connection. As will be seen, the primary ramp regions (59, 61 in FIGS. 2 and 3) are selectively positioned to contact and interfere prior to full engagement of the cylindrical sealing surfaces (53, 63 in FIGS. 2 and 3) and to be in full or near full clearance as the primary engagement of the cylindrical sealing surfaces 53, 63 occurs during the make-up of the connection.

With reference to FIG. 4, the connection is shown in the hand tight position with the pin surface of the cylindrical metal-to-metal seal indicated at 67 and the box surface of the cylindrical metal-to-metal seal indicated at 69. The ramp starting point of engagement is illustrated generally at 71.

Figure 5:
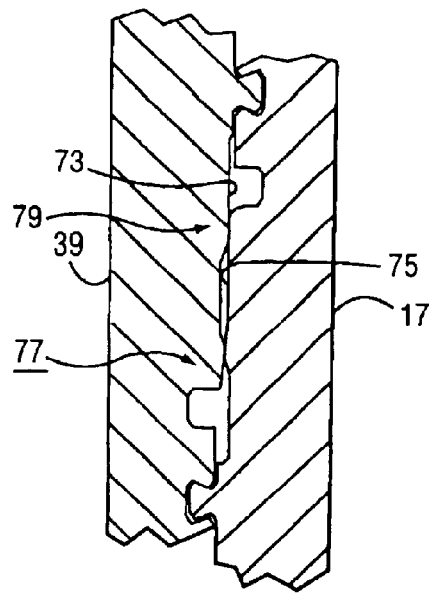

FIG. 5 shows the connection at the point of maximum interference of the primary ramp regions. Note the position of the pin cylindrical metal-to-metal sealing surface at 73 and the box cylindrical metal-to-metal sealing surface at 75. The ramp regions are shown in full engagement at the point designated generally as 77. Note that in the illustrated embodiment of the invention, the mating cylindrical sealing surfaces are positioned on the box interior surface and on the pin exterior surface, respectively, so as to provide a desired degree of overlap before receiving an amount of interference necessary to form the primary containment seal for sealing off high-pressure liquids and/or gases. The overlap region is indicated generally at 79 in FIG. 5. The desired degree of overlap is pre-determined so as to guarantee a bearing pressure which will resist galling and damage as interference is transferred from the primary ramp regions to the cylindrical sealing surfaces of the connection.

Figure 6:
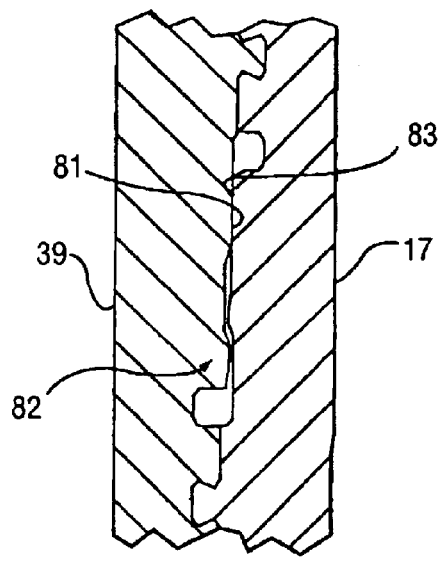

FIG. 6 shows the connection in the full, power tight position once the connection has been fully made up. The pin cylindrical sealing surface is indicated at 81 and the box cylindrical sealing surface at 83. Note that the primary ramp regions, illustrated at region 82 in FIG. 6, are in total disengagement. It will be understood that, to achieve the desired radial interference between the cylindrical surfaces, the pin and box should not be stressed beyond their yield strength by the described ramping action in order to ensure that the cylindrical surfaces have sufficient radial interference to form a good seal.

FIGS. 7–10 illustrate the application of the cylindrical seal concept of the invention to API connections or non-shouldered connections. FIG. 7 shows a connection which includes the box member 83 having internally threaded regions 85, 87 for matingly engaging the oppositely arranged and threaded pin members 89, 91. FIG. 7 illustrates the connection in the hand tight position with the pin cylindrical seal regions shown at 93, 95 and with the box ramp regions illustrated at 97, 99.

FIG. 8 illustrates the next position which occurs during make-up of the connection in which the pin ramp regions ride up and atop the box ramp regions, these positions being illustrated generally at 102, 103. In both FIGS. 7 and 8, the pin primary sealing surfaces 93, 95 are basically in clearance with respect to the box sealing surface 101.

FIG. 9 shows the connection in the next position of assembly which is the start of the sealing integrity of the containment seal. In this position, the pin ramp regions are now riding down the respective box ramp regions, these regions being indicated generally at 105, 107 in FIG. 9. Note the interference which is now present at the primary sealing surfaces 106, 108.

FIG. 10 illustrates the connection at the end of the stroke with full sealing integrity. In this position, the pin members 89, 91 are in engagement with full interference at the primary sealing surfaces 109, 111 and with the ramp regions being in clearance, the regions being illustrated generally at 113, 115 in FIG. 10.

Although the preferred form of the invention has been described with reference to cylindrical metal-to-metal containment seals, it will be understood that an elastomer seal ring or region can also be utilized along with the described metal-to-metal seals, for example, as a gas containment seal in very severe environments or generally as a backup in cases where redundant seals are required.

Figure 11:
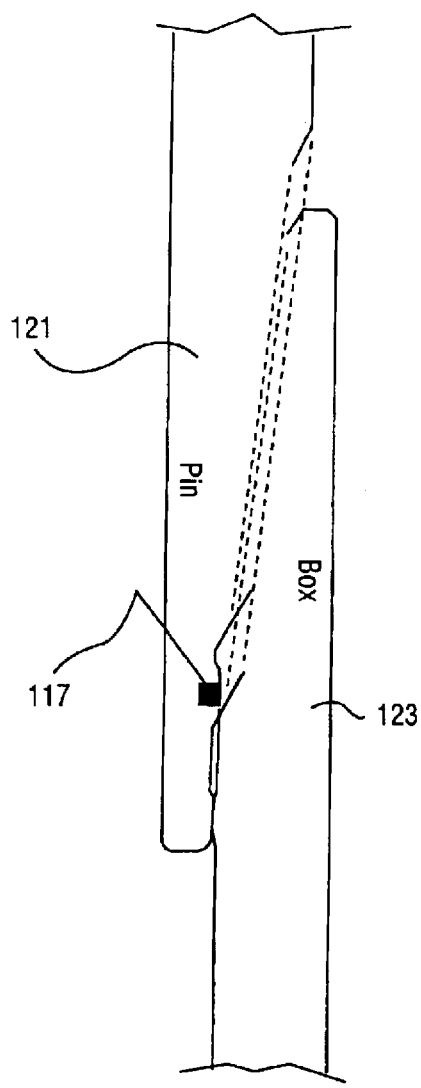
FIG. 11 is a modified cylindrical seal with an elastomeric seal on the pin which provides a gas containment seal for very severe service.
Figure 12:
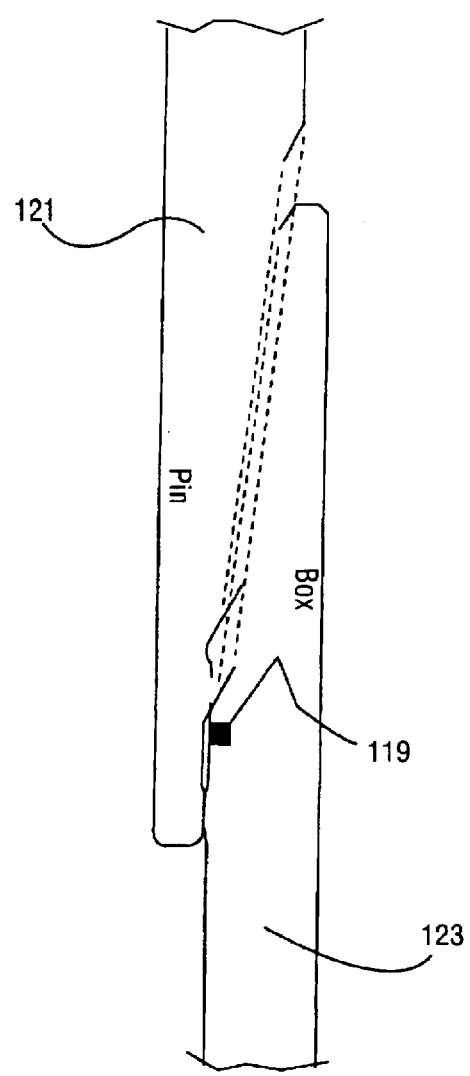
FIG. 12 is a modified cylindrical metal-to-metal seal with an elastomeric seal on the box as a backup in cases where redundant seals are required.

FIGS. 11 and 12 show such circumferential elastomeric seal rings 117, 119 on the pin end 121 and box end 123, respectively. The elastomeric seal rings 117, 119 can be formed of any suitable material commonly utilized in the relevant industry, for example, TEFLON, or fiberglass reinforced TEFLON, synthetic rubber, and/or any combination thereof. In the embodiment of the invention illustrated in FIGS. 11 and 12, the elastomeric seal rings 117, 119 are located in the previously described "overlap regions" of the cylindrical sealing surfaces of the connection (generally at 79 in FIG. 5). Also, the invention may have additional sealing surfaces whether metal-to-metal and/or elastomeric rings included. FIG. 13 shows another embodiment of the invention in which the pin 125 and box 127 are provided with metal-to-metal cylindrical sealing surfaces 129, 131 spaced approximately equidistantly on either side of the pin and box ramp regions 133, 135 respectively.

The invention has been provided with several advantages. As described with respect to FIGS. 2–6, the containment seal of the invention features ramp regions that simulate a pin swaging and/or box expansion resulting in the ability of the cylindrical sealing components 53, 63 (FIGS. 2 and 3) to assemble with no interference or only very slight interference. This feature helps to guarantee that the cylindrical components of the seal will not gall during the primary or early stages of assembly. Generally the cylindrical components can have a slight overlap before receiving the appropriate interference required to seal off the gas or fluid pressures within the conduit. The seal assembly, if desired, can also be provided with secondary ramp regions to gradually transfer the required interference or, if desired, radically transfer the interference to the cylindrical sealing surfaces of the connection.

The cylindrical seal components of the seal are unique in that the interference which is produced does not gain or lose diametrical interference within a very generous stroke of assembly. This is of a particular advantage with connections that do not have shoulders acting as torque stops, as previously discussed. Another benefit of the connection is the inherent damage protection of the cylindrical sealing components of the seal structure. Often during assembly, if the connection is not lubricated properly, conventional tapered metal-to-metal seals will gall and lose their integrity. This result occurs because of the long steady gradual gain of interference which develops heat and greatly enhances the possibility of balling up and separating the seal surfaces due to galling. Thus, even though the connection is designed with the correct diametrical interference, the connection would then leak because the surfaces would have a gap formed therebetween. The containment seal of the invention, on the other hand, is provided with a separate ramp, which, even if improperly lubricated, or purposely non-lubricated, and subsequently damaged, does not affect the integrity of the sealed surfaces with the sealed surfaces remaining intact and seal integrity being preserved.

If desired, the swaging/expanding ramps of the design may be provided with lubrication grooves and/or specially machined and/or textured surfaces or plated surfaces to retain lubrication during the mechanics of assembly. FIG. 13 shows example surfaces 130 which, in this case, are lubrication grooves. Also, the ramps can be positioned higher than the cylindrical seal and/or elastomer ring to protect the sealing surfaces from stabbing and destabbing during assembly and disassembly operations. Higher interferences are generally required in larger diameter casing, for example, because the required interference is a function of diameter. Higher interference can result in a higher danger of galling because of the possibility of heat generation. Lubrication grooves can be provided to ensure that the frictional effects are controlled during the assembly process.

The axial position of the swaging/expanding ramps can be designed either before and/or after the cylindrical sealing surfaces. A single ramp without clearance areas may be used in designs where there are axial design limits to the overall length which may be employed. API 8 Round has a J area, (designated as "J" in FIG. 14) for example, that limits the design length, if the design criteria requires that the same coupling length be maintained. FIG. 14 also illustrates the cylindrical sealing surfaces 137, 139 and the ramp regions 141, 143, 145, 147 of the connection. The present design allows the unique cylindrical sealing surfaces and ramp regions to be optimally sized, however, to accomplish a reliable seal. The ramp regions of the design can be provided in a simple form, such as "lead in chamfer" for economical production.

The containment seal structure of the invention will have full integrity and the same quantity of diametrical interference within a wide range of stroke, unlike the common tapered seals that gain or lose diametrical interference depending on the position falling short or overshooting the design criteria position. Positional tolerances of the present connection can be opened, thereby enabling the designer the opportunity of a higher degree of mass production while maintaining quality assurance standards. This provides the designer an opportunity to enhance the design performance of standard products such as the basic API connections.

If desired, the design can include a clearance pocket for the ramp regions to provide clearance for raised material caused by inadvertently damaging the ramp regions. By providing a clearance pocket, the raised damage area would not "jack open" the cylindrical seal component and destroy the integrity of the pressure containment. The ramp regions themselves also provide a zone or clearance which acts in the nature of a pressure relief valve where conditions require pressure relief. The separated ramp and cylindrical sealing surfaces and clearances which they provide offer unique advantages for a dope-less connection, since there is less likelihood of galling the metal-to-metal seal area in service.

If desired, the design can include an elastomer ring to compliment the cylindrical seal and/or be used as the primary sealing structure.

While the invention has been shown in only one of its forms, it is not thus limited but is susceptible to various changes and modifications without departing from the spirit thereof.

What is claimed is:

1. A threaded connection characterized as having a cylindrical metal-to-metal, high pressure containment seal capable of sealing both liquids and gases, the connection comprising:
   a first member having a box end, the box end having an end opening defining an interior surface with internal threads, the internal threads being defined by crests and roots and opposing flanks;
   a second, mating member having a pin end, the pin end having an exterior surface with mating external threads, the external threads also having crests and roots and opposing flanks, at least selected ones of which move into engagement with the internal threads of the box when the connection is made up;
   a generally cylindrical sealing surface on the box interior surface and a mating generally cylindrical sealing surface on the pin exterior surface which form a primary containment seal upon make up of the connection;
   a primary ramp region formed on the pin exterior surface and a mating primary ramp region formed on the box interior surface, the primary ramp regions being separated from and/or adjacent to the cylindrical sealing surfaces which form the primary containment seal, the primary ramp regions being positioned with respect to the cylindrical sealing surfaces to simulate pin swaging and box expansion prior to full engagement of the cylindrical sealing surfaces, whereby the cylindrical sealing surfaces assemble with little or no interference; and
   wherein the primary ramp regions are selectively positioned to contact and interfere prior to full engagement of the cylindrical sealing surfaces and to be in full or near clearance as the primary engagement of the cylindrical sealing surfaces occurs during the make up of the connection.

2. The threaded connection of claim 1, wherein the mating cylindrical sealing surfaces are positioned on the box interior surface and on the pin exterior surface, respectively, so as to provide a desired degree of overlap before receiving an amount of interference necessary to form the primary containment seal for sealing off high pressure liquids and/or gases.

3. The threaded connection of claim 2, wherein the desired degree of overlap is predetermined so as to guarantee a bearing pressure which will resist galling and damage as interference is transferred from the ramp regions to the cylindrical sealing surfaces of the connection.

4. The threaded connection of claim 3, wherein the threaded connection is provided with mating secondary ramp regions to transfer a selected gradual degree or radical degree of interference to one or more cylindrical sealing surfaces.

5. The threaded connection of claim 1, wherein the connection has mating threaded surfaces which are selected from the group consisting of API 8 Round, API 10 Round, API Buttress and premium threaded connections lacking shoulders to act as torque stops.

6. The threaded connection of claim 1, wherein the mating ramp regions are provided with a selected one of lubrication grooves, specifically machined surfaces, specifically textured surfaces and plated surfaces to retain lubrication during the mechanics of assembly of the connection.

7. The threaded connection of claim 1, wherein the pin primary ramp region is located between one or more pin cylindrical sealing surfaces and an outer extent of the pin end of the connection member.

8. The threaded connection of claim 1, wherein the pin primary ramp region is located on a surface which is adjacent the pin cylindrical sealing surface and on a side of the cylindrical sealing surface which is opposite the outer extent of the pin end of the connection member.

9. The threaded connection of claim 1, wherein at least one clearance pocket is provided adjacent the mating ramp regions to provide clearance for raised material caused by inadvertent damage to the ramp regions.

10. The threaded connection of claim 1, wherein the connection is a shouldered connection.

11. The threaded connection of claim 1, wherein an elastomeric seal ring is present on a selected one of the pin and box surfaces in addition to the generally cylindrical sealing surfaces.

12. The threaded connection of claim 11, wherein the elastomeric seal ring is located at an overlap region of a selected one of the pin and box cylindrical sealing surfaces.

13. The threaded connection of claim 1, wherein the connection is a dope-less connection.

14. The threaded connection of claim 11, wherein the ramp regions are positioned at selected radial positions which are higher than the respective cylindrical sealing surfaces or elastomeric sealing ring, as viewed in cross-section, in order to protect the sealing surfaces from stabbing and destabbing during assembly and disassembly.

15. The threaded connection of claim 1, wherein the ramp regions themselves constitute a clearance zone which provides pressure relief during assembly.

16. A threaded pipe connection for oil field tubular goods and characterized as having a cylindrical metal-to-metal, high pressure containment seal capable of sealing well bore liquids and gases, the connection comprising:
   a first pipe member having a box end, the box end having an end opening defining an interior surface with internal threads, the internal threads being defined by crests and roots and stab flanks and load flanks;
   a second, mating pipe member having a pin end, the pin end having an exterior surface with mating external threads, the external threads also having crests and roots and opposing stab flanks and load flanks, at least selected ones of which move into engagement with the internal threads of the box when the connection is made up;
   a generally cylindrical sealing surface on the box interior surface and a mating generally cylindrical sealing surface on the pin exterior surface which form a primary containment seal upon make up of the connection;
   a primary ramp region formed on the pin exterior surface and a mating primary ramp region formed on the box interior surface, the primary ramp regions being separated from and/or adjacent to the cylindrical sealing surfaces which form the primary containment seal, the primary ramp regions being positioned with respect to the cylindrical sealing surfaces to simulate pin swaging and box expansion prior to full engagement of the cylindrical sealing surfaces, whereby the cylindrical sealing surfaces assemble with little or no interference, the ramp regions being in full interference prior to full engagement of the cylindrical sealing regions and being in clearance upon full engagement of the cylindrical sealing regions.

17. The threaded connection of claim 16, wherein the primary ramp regions are positioned on the box interior surface and on the pin exterior surface in a preselected location, whereby the pin end ramp region first rides up and onto the box primary ramp region as the connection is made up, whereby engagement of the primary ramp regions exerts an inward radial force on the pin end of the second, mating pipe member.

18. The threaded connection of claim 17, wherein the pin end primary ramp region then rides down the box primary ramp region as the connection continues to be made up, the primary ramp regions then entering a clearance region as the cylindrical sealing surfaces make contact and move to a fully engaged position.

19. The threaded connection of claim 16, wherein the mating cylindrical sealing surfaces are positioned on the box interior surface and on the pin exterior surface, respectively, so as to provide a desired degree of overlap before receiving an amount of interference necessary to form the primary containment seal for sealing off high pressure liquids and/or gases.

20. The threaded connection of claim 19, wherein the desired degree of overlap is predetermined so as to guarantee a bearing pressure which will resist galling and damage as interference is transferred from the ramp regions to the cylindrical sealing surfaces of the connection.

21. The threaded connection of claim 16, wherein the threaded connection is provided with mating secondary ramp regions to transfer a selected gradual degree or radical degree of interference to the cylindrical sealing surfaces.

22. The threaded connection of claim 16, wherein the connection has mating threaded surfaces which are selected from the group consisting of API 8 Round, API 10 Round, API Buttress and premium threaded connections lacking shoulders to act as torque stops.

23. The threaded connection of claim 16, wherein the mating ramp regions are provided with a selected one of lubrication grooves, specifically machined surfaces, specifically textured surfaces and plated surfaces to retain lubrication during the mechanics of assembly of the connection.

24. The threaded connection of claim 16, wherein the pin primary ramp region is located between one or more pin cylindrical sealing surfaces and an outer extent of the pin end of the pipe member.

25. The threaded connection of claim 16, wherein the pin primary ramp region is located on a surface which is adjacent the pin cylindrical sealing surface and on a side of the cylindrical sealing surface which is opposite the outer extent of the pin end of the pipe member.

26. The threaded connection of claim 16, wherein at least one clearance pocket is provided adjacent the mating ramp regions to provide clearance for raised material caused by inadvertent damage to the ramp regions.

* * * * *